Dec. 21, 1937.  W. J. MILLER  2,103,086
APPARATUS FOR MANUFACTURING POTTERY WARE
Filed June 10, 1935
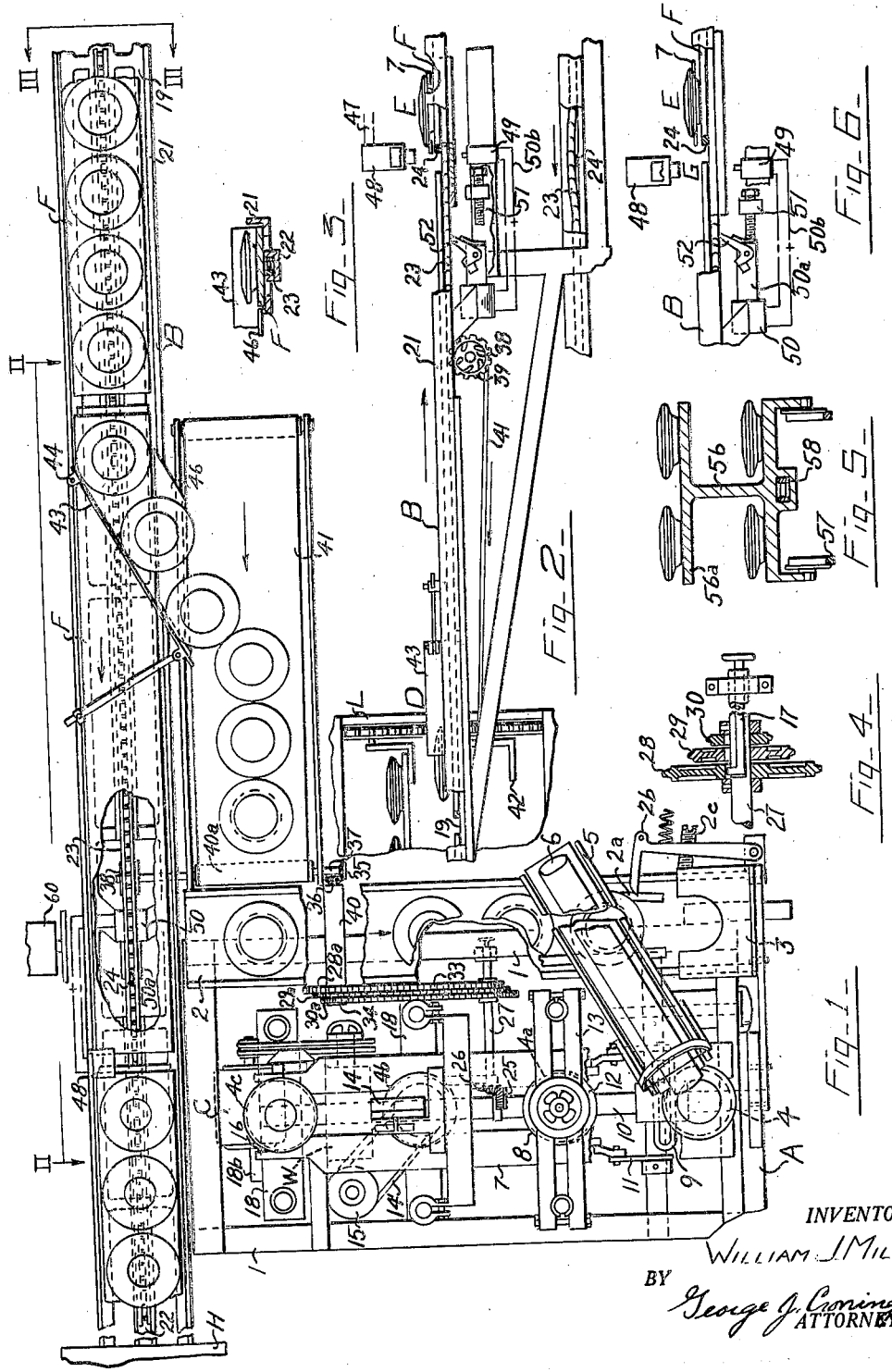
INVENTOR.
WILLIAM J MILLER
BY George J. Croninger
ATTORNEYS.

Patented Dec. 21, 1937

2,103,086

UNITED STATES PATENT OFFICE 2,103,086

APPARATUS FOR MANUFACTURING POTTERY WARE

William J. Miller, Swissvale, Pa.

Application June 10, 1935, Serial No. 25,701

12 Claims. (Cl. 25—2)

This invention relates to the manufacture of potteryware, particularly dinnerware such as plates, cups and saucers from plastic clay mass to dried ware ready for the bisque kiln on absorbent molds. It has to do with fabricating mechanism such as that shown in my co-pending application for United States Letters Patent Serial Number 5,795 which may be disposed in operative adjacency to a mold conveying means and operated in synchronism therewith, the empty molds being automatically removed from the conveyor and plastic clay fed thereto and formed and then returned to the conveyor automatically, certain adjustments being provided to adjust the linear travel of the conveyor while in operation and while the driving connection subsists.

The objects are to provide means for automatically removing molds from an intermittently or continuously driven conveyor having mold carriers arranged in preferably endwise spaced relationship and traveling in a rectilinear horizontal plane together with mechanism for returning the molds with jiggered ware thereon to the carriers, the mechanism operating in synchronism with the movement or drive of the conveyor as well as the drive of the ware fabricating machine; to provide means to automatically compensate for the relative spacing of the carriers on the conveyor chain to insure the accurate positioning of the carriers relatively to the mold transfer means at the time of mold transfer thereto; to enable the selective change over from one size mold to another on the production line and the quick readjustment of the linear travel of the conveyor as respects a normal mold transfer cycle; to provide for a completely automatic production cycle through a fabricating machine, dryer and stripping station wherein the molds are conveyed in file and in an endless predetermined path or paths therethrough; to provide for a semi-manual system with manual "carry out and return" of mold carriers between the machine and a chain dryer and in this latter phase to reduce the frequency of the operator's trips and increase his available time for performing other duties, and to avoid production handicaps and increased labor costs where a long carry exists between the machine and dryer.

The preferred operation sequence is, to advance one or more mold supports arranged in longitudinal alignment successively past a point of mold removal, removing the molds progressively from one end of the carrier to the other and feeding the molds in succession to and through a charge applying station, a forming station and a jiggering station, whilst the carrier or carriers are advanced in timed relation with these fabricating steps to a point of mold replacement, the distance traversed by each carrier for each machine cycle being approximately equal to the diameter of a mold; periodically advancing a carrier a linear distance equal to substantially the gap between two carriers (in addition to the normal linear travel thereof for one machine cycle) just prior to the replacement of the initial filled mold thereon by means of a photo-electric relay and electromagnetic propulsion device associated with the conveyor, the beam being normally interrupted by the carriers until the occurrence of the gap therebetween; continuing the normal linear advance of the carrier in timed relation with the replacement of molds thereon until filled to capacity and repeating the procedure for successive carriers. The carriers may be travelled by the conveyor automatically to and through a tunnel dryer at a rate commensurate with the most efficient drying of the ware, the ware subsequently stripped and the molds and carriers cyclically returned to the machine, or, the carriers may be manually transported to a chain dryer and attached to the hooks thereof, the mold runner returning a carrier with empty molds thereon to the conveyor.

In the drawing: Fig. 1 is a top plan view of the preferred form of apparatus; Fig. 2 is a fragmentary elevation taken in the direction of the arrows 2—2 of Fig. 1 showing additionally a fragment of dryer and chain dryer conveyor; Fig. 3 is a transverse vertical section taken on line 3—3 of Fig. 1; Fig. 4 is a detail partly in section of the change speed drive for the conveyor of Fig. 1; Fig. 5 is a fragmentary elevation disclosing the electro-magnetic propulsion means in one position of adjustment; Fig. 6 is a sectional elevation of a mold transporting car embodying a plurality of shelves.

The preferred apparatus, Fig. 1, comprises an automatic ware fabricating machine A, substantially the same as that shown and described in my co-pending application supra, except for such alterations as required to adapt it to synchronized operation in conjunction with a mold conveyor B, although other types of automatic ware fabricating apparatus may be substituted therefor, for instance, the automatic jiggers disclosed in my Patent Number 1,769,528 or my Patent Number 1,809,861.

Briefly, the automatic jiggering machine comprises a mobile frame 1 having an accumulator belt conveyor 2 for intermittently advancing empty molds between guides 2a in the direction of the arrow into a reciprocable mold transfer 3 which periodically lifts and advances the same in succession to centered position over an elevatable ring chuck 4. Juxtaposed with relation to the chuck is a clay feeding and charge forming apparatus 5 operable intermittently to slice charges in overbalanced position from the lead end of an intermittently advanced clay billet 6, for gravitation onto the central portion of an elevated mold. A transfer frame 7 with a multiple of mold seats 8, reciprocated by cam 9 on main drive shaft 10 through arms 11, advances charged molds in succession to centered position over a chuck 4a, elevatable by a cam on main drive shaft 10 and crosshead as at 18 to move the mold into co-operation with a forming die 12 adjustably attached to lintel 13, to spread, form, conform and adhesively bond the clay to the ware forming surface of the mold, the transfer being retracted incident to mold elevation for subsequent replacement of the mold on the next succeeding seat.

The mold with blank thereon is advanced to centered position over chuck 4b and elevated for rotation in co-operation with an edged profile tool 14 to smooth the exposed surface of the clay, the chuck spindle being rotated by belt and pulley connections 14$^1$ and 15 controlled by an automatic clutch (not shown). Instrumentalities are provided for lubricating the surface of the clay incident to profiling and for trimming the brim of excess clay.

The mold with jiggered ware thereon is then advanced to an intermediate transfer station where a chuck 4C on a cross-head 18 elevated by cam 18b lifts the mold whilst the transfer is retracted for the replacement of the mold in the open right end seat 16 for subsequent replacement on a mold carrier F at E as will be described.

The machine is operated in repeated cycles by motor C, the main shaft being driven through a variable speed transmission W. The jiggering machine produces one piece of ware ready for the dryer incident to each cycle whilst a plurality of ware is in various formative stages. The conveyor shown includes a horizontal track 19, Fig. 2, which may be attached to the machine frame or supported independently thereof and has spaced guide rails 21, Fig. 3, and a central channel 22 for the reception and slidable support of an endless chain 23 with spaced upstanding lugs 24 for engagement with and positive propulsion of mold carriers or supports F.

An intermittent drive for the chain is provided through an assembly preferably driven by the machine. The gear segment 25 on the main drive shaft 10 intermittently rotates shaft 27 through pinion 26, the shaft 27 having a multiple of change speed sprockets 28, 29, and 30, Fig. 4, adapted to be selectively and individually coupled in the drive by longitudinally adjustable key 17. Drive chains 33, Fig. 1, are connected to complemental sprockets 28a, 29a, and 30a keyed on shaft 34 which drives clutch shaft 37 through pinions 35 and 26, and overrunning ratchet clutch 38 and sprocket 39 engaging the chain 23. Belts rolls 40 and 40a keyed on shafts 34 and 37 respectively advance belts 2 and 41, Fig. 1, simultaneously with chain 23, all three being intermittently advanced in timed relation with the machine, the normal linear travel per machine cycle being adjustable by key 17. The gear segment may be replaced by a ring gear and the conveyors driven constantly at a given speed, variable through key 17 as desired or the machine and conveyors may be driven independently, a motor driving shaft 37 through variable speed transmissions such, for instance, as that shown.

A mold deflecting plate 43 pivotally mounted at 44 over the conveyor for selective angular positioning deflects the molds from carriers F over floor plate 46 and onto belt 41, the deflector defining a zone D of mold removal. Mold carriers F are advanced to and through and from this zone either intermittently or continuously and on track 19 toward the zone of mold replacement E (defined by transfer 7), Fig. 2, by overrunning clutch 38 and into adjacency to zone G, Fig. 6, where an automatic apparatus operable in response to the position and/or movement of the carriers is located for advancing the carriers independently of clutch 38 as will be described.

This apparatus comprises a photo-electric relay 47 having the beam element 48 mounted for horizontal adjustment in vertical position on track 19 to direct a ray toward a receptor element 49 located therebelow and connected in circuit with the armature of a solenoid 50. Normally, the beam is interrupted by the carriers but when a gap between two carriers reaches the zone G adjacent the transfer point E, the solenoid is energized through circuit 50b, core 50a advanced and the conveyor and all of the carriers given a quick abnormal advance in the direction of the arrow by one way pawl 52 a distance adjustably determined by the setting of limit screw 51 and/or the instant of interruption of the light beam and retraction of the pawl 52. This advance occurs subsequent to the placement of the last mold on the preceding carrier F preferably during the carrier's normal advance to avoid the replacement of a mold in the gap between carriers and to move the lead end of the empty carrier up to a position where, upon normal subsequent advance thereof by clutch 38, it will feed adjacent the mold replacement point E in timed relation with the replacement of molds thereon.

The molds are replaced in a row on each carrier by transfer 7 the extent and/or rate of carrier advance past point E being adjusted with relation to a reciprocation cycle of transfer 7 so as to fill each carrier to capacity, the molds being preferably placed in as close abutting relation as practical without interfering with the operation of the transfer.

Normally, the conveyor B and carriers are advanced by clutch 38 a predetermined distance approximately equal to the diameter of a mold for one revolution of shaft 7. It is understood, of course, that more molds of a smaller size may be accumulated on a carrier than those of a larger diameter and the carrier speed and/or degree of advance past point E varied accordingly with respect to speed of travel of transfer 7 in the replacement of molds, the rate of speed thereof being also variable.

In operation molds are deflected successively at D onto conveyor 41, a mold is advanced from conveyor 41 to conveyor 2 and a mold removed from conveyor 2 and started on its stepwise advance through the fabricating machine preceded by other mold undergoing the feeding of clay thereto, die forming and jiggering at the points mentioned, the transfer 7 completing one reciprocation and conveying a filled mold from chuck 4c to carrier F.

After a predetermined number of machine cycles, and the replacement of filled molds at definite intervals and in definite positions, a carrier is loaded with molds and the abnormal advance of all of the carriers ensues, the machine and transfer 7 operating without interruption and the next succeeding carrier moving up into place for receiving the next succeeding mold.

If desired, the gear segment 25 may be replaced by a ring gear and the conveyor chain and carriers F replaced by an endless belt operated continuously with belt 2. The molds are then preferably removed directly onto the tail end of the belt by a solenoid "push off" 60 intermittently actuated by a cam controlled switch or other device, not shown. The "push off" may be elongated if desired to engage and remove a multiple of molds laterally at one time onto conveyor 41 and in that event conveyor 41 would feed conveyor 2 as described. In either event, the molds on belt 2 are advanced against a pivoted spring pressed stop 2b and closed up to overcome gaps therebetween, the stop working below the brims and against their bases. It controls the instant of advance of reserve molds into the seat of transfer 3 otherwise preventing the approach beyond a predetermined point but is moved out of position by the transfer incident to return to position of Fig. 1, the instant and extent of movement being adjustable by screw 2c.

The apparatus so far described may form a part of a full automatic production system wherein the molds are automatically travelled in circuit on the carriers then detoured to and through a multiple of ware forming stations, then returned to the carriers for travel to and through a dryer L, a stripping and oiling station and back to the machine. The chain 23 and carriers may represent only a section of an endless horizontal conveyor having preferably a rectilinear horizontal portion at least in the zone of the machine, the conveyor traversing a tunnel dryer H, Fig. 2, wherein the ware is subjected for a predetermined interval to a drying atmosphere of controlled temperature and humidity.

The machine may be operated with an independent chain dryer I and the molds and/or carriers with molds thereon transferred automatically or manually between chain hooks 42 the machine and short loop conveyor B as in Fig. 2. If desired, a multiple of independent carriers may be positioned in vertical and/or horizontal parallelism forming one or more lines and advanced independently or unitarily at the same or at varying speeds.

The carriers may be also combined in a unitary car construction 56, the carriers taking the form of co-extensive shelves 56a arranged in tiers. The cars are preferably traveled on a track 57 and are connected in spaced relation by a common means such as a chain 58 for the uni-directional advance thereof in single or multiple lines continuously or intermittently through a ware fabricating station or stations and a dryer.

The ware fabricating station in this instance would consist of a battery of automatic machines such as that herein described and the molds would be transferred directly to and/or from the shelves 56a, the cars being given an abnormal advance as described herein. One or more machines are located on each side of the cars, each machine operating at a predetermined level corresponding to the level of a line of molds. The machines may be operated at the same rate of speed or at varying speeds through independent control facilities all depending upon the number of molds on a carrier, as determined by their size. The normal speed of the car however is preferably maintained. Owing to the automatic mold transfer provisions, the attendant is relieved of mold handling duties and may thus service several machines. If desired, the molds may be transferred manually between the fabricating machine and the cars.

By means of the apparatus shown and described herein, the number of molds which may be transported between the dryer and the jiggering machine at one time may be considerably increased thus affording a reduction in the number of men needed to service the machine in respect of mold requirements. Ordinarily, we would require the services of at least two men where the machine is operating in the higher speed brackets.

I claim:

1. Apparatus for the manufacture of potteryware comprising, in combination, a dryer having a conveyor therein and a plurality of removable mold supports, an automatic potteryware fabricating machine, conveying means on which a plurality of said mold supports may be arranged in endwise relation located adjacent said fabricating machine, means for moving said supports in timed relation with the operation of said fabricating machine and means for automatically transferring molds from said supports to said machine for filling and means for transferring filled molds from said machine to said supports, said supports being replaced on said dryer conveyor when filled with filled molds.

2. In apparatus for the manufacture of potteryware the combination which comprises, a dryer, a plurality of mold supports, conveying means for traveling said supports in said dryer, an automatic pottery ware fabricating machine, conveying means located adjacent said fabricating machine for moving said mold supports in endwise relation adjacent said fabricating machine, means for removing empty molds from said supports whilst said supports continue to travel adjacent said fabricating machine, means for transporting said molds to and through said fabricating machine for filling and means for automatically replacing filled molds on said supports.

3. Apparatus for the manufacture of potteryware which comprises, in combination, a dryer having a chain conveyor therein, an automatic potteryware fabricating machine, a plurality of mold supports associated with said chain conveyor, means for advancing said supports in endwise spaced relation relative to said fabricating machine, means for removing molds from said supports at a predetermined point whilst continuing the advance of the supports toward a point of mold replacement, means for conveying the molds to and through the potteryware fabricating machine, means for applying clay to the molds, jiggering means, and means for transferring molds with jiggered ware thereon to said supports.

4. In apparatus for the manufacture of potteryware on absorbent molds wherein the molds are disposed in multiple on elongated supports, the combination which comprises an automatic potteryware fabricating machine having a plurality of mold conveyors associated therewith, means for traveling mold supports relative to said fabricating machine and means for transferring molds from said supports to the conveyors of said fabricating machine, said means for travelling mold supports relative to said fabricating machine comprising a conveyor arranged to receive said mold supports in endwise spaced relation, means for driving said conveyor and means for imparting an abnormal advance to said conveyor in response to a predetermined advance of said supports.

5. In apparatus for the manufacture of potteryware, a machine for manufacturing potteryware on molds, means for operating the machine in repeated cycles, a conveyor adjacent said machine, a plurality of mold supports arranged in endwise spaced relation on said conveyor, means for driving said machine and said conveyor in timed relation, and means for traveling said conveyor independently of said drive means, said means for travelling said conveyor independently of said drive means being operable in response to a predetermined advance of said mold supports on said conveyor.

6. In apparatus for the manufacture of potteryware, the combination which comprises, a jiggering machine, a conveyor located adjacent said machine, a plurality of mold supports arranged in endwise spaced relation on said conveyor, driving means for traveling said conveyor and mold supports in timed relation with the operation of said machine, means for removing empty molds from said mold supports incident to the advance thereof and means for replacing filled molds on said supports, and intermittently operable means for advancing said conveyor after a predetermined number of machine cycles to compensate for the spacing which occurs between mold supports.

7. In apparatus for the manufacture of potteryware, a potteryware jiggering machine, a horizontal conveyor for mold carriers located adjacent thereto, means for removing empty molds from said carriers, means for travelling said molds to said fabricating machine, means for replacing filled molds on said mold carriers on said horizontal conveyor, means for driving said conveyor and said fabricating machine and a dryer to which filled molds are subsequently transferred.

8. In apparatus for the manufacture of potteryware on molds, a potteryware fabricating machine, a horizontal mold conveyor located adjacent said machine, mold actuating means for said conveyor and said machine, a drive for said conveyor, variable speed means interposed in said drive, mold conveyors associated with said machine, a deflector plate for diverting empty molds from the first named means to said last named means, and means for transferring filled molds from the machine to said first named conveying means.

9. In apparatus for the manufacture of potteryware, the combination which comprises, a potteryware fabricating machine, a mold conveyor for travelling molds in a substantially horizontal plane adjacent said machine, means associated with said fabricating machine for the accumulation of empty molds, a deflector plate for removing molds from said first named conveying means and guiding the same onto said accumulating means and means for transferring filled molds from said fabricating machine to said first named conveying means.

10. In apparatus for the manufacture of potteryware, a potteryware fabricating machine, a horizontal conveyor located adjacent said machine and adapted to transport empty molds into adjacency thereto and to remove filled molds therefrom, drive means for said conveyor and said fabricating machine, a mold accumulating conveyor associated with said fabricating machine and means for deflecting empty molds from said horizontal conveyor onto said mold accumulating conveyor, and a reciprocating transfer for removing filled molds from said machine and transferring the same to said horizontal conveyor.

11. In apparatus for the manufacture of potteryware, the combination which comprises, a potteryware fabricating machine which automatically jiggers potteryware in or on molds, a horizontal conveyor located adjacent said machine for delivering empty molds thereto and removing filled molds therefrom, mold boards disposed on said conveyor and located in endwise spaced relation, said conveyor including a chain having spaced lugs thereon adapted to engage said boards, an accumulating conveyor for empty molds associated with said fabricating machine, a plate for deflecting molds from said first named conveying means onto said mold accumulating means, common drive means for said fabricating machine, said conveying means and said mold actuating means, an independently controllable drive mechanism for said first named conveying means and a reciprocable transfer means for replacing filled molds on said first named conveyor.

12. In apparatus for the manufacture of potteryware, a jiggering machine, conveying means for travelling a plurality of mold carriers in endwise spaced relation past said jiggering machine, means for transferring empty molds from said mold carriers to said last named mold conveyor for transportation to the said jiggering machine for filling, means for transferring filled molds from said jiggering machine to said carriers, drive means for said conveying means, intermittently operable means for actuating said first named conveying means, and means for controlling the operation of said intermittently operable means.

WILLIAM J. MILLER.